United States Patent [19]

Smith et al.

[11] Patent Number: 5,333,506
[45] Date of Patent: Aug. 2, 1994

[54] GAUGE FOR MEASURING THE ATOMIZATION AIR PRESSURE IN A PAINT SPRAY GUN

[75] Inventors: Rowland C. Smith, Wimborne; Neville T. Pettit, Lymington; Angelo Guttoriello, Weymouth, all of United Kingdom

[73] Assignee: ITW Limited, Windsor, United Kingdom

[21] Appl. No.: 52,071

[22] Filed: Apr. 22, 1993

[30] Foreign Application Priority Data

Apr. 24, 1992 [GB] United Kingdom ............. 9208872.3
Dec. 21, 1992 [GB] United Kingdom ............. 9226626.1

[51] Int. Cl.⁵ ...................................... G01L 7/00
[52] U.S. Cl. .............................. 73/756; 73/431; 73/714
[58] Field of Search ............... 73/299, 300, 301, 756, 73/146.8, 431, 714; 137/224, 226

[56] References Cited

U.S. PATENT DOCUMENTS 3,479,868 11/1969 Boyer ........................... 73/146.8
5,063,784 11/1991 Ridenour ......................... 73/756
5,131,275 7/1992 Huang ......................... 73/146.8 X

FOREIGN PATENT DOCUMENTS 34172    4/1931  United Kingdom .
1100055  1/1968  United Kingdom .
1209698 10/1970  United Kingdom .

Primary Examiner—Richard E. Chilcot, Jr.
Assistant Examiner—Joseph L. Felber
Attorney, Agent, or Firm—MacMillan, Sobanski & Todd

[57] ABSTRACT

A pressure test gauge is described, more particularly for testing the air pressure at the outlet of a spray gun. The pressure test gauge comprises a body having an inlet which may take the form of a replaceable screw-in-unit sealed airtight with the body. The unit encircles the inlet and connects with passages passing through body. The passage is a small bore tube which connects the inlet with a pressure gauge which has a display. Intermediate the inlet unit and gauge is a valve comprising a barrel with an outer screw-thread screwed into the body. Extending axially of the valve is a metering hole. The gauge body may have ribs for facilitate gripping the body and a bracket with screws to secure it to a wall.

7 Claims, 2 Drawing Sheets

GAUGE FOR MEASURING THE ATOMIZATION AIR PRESSURE IN A PAINT SPRAY GUN

This invention relates to a pressure test gauge more particularly for testing the air pressure at the outlet nozzle of a spray gun.

In known spray guns for spraying paint or other fluids the outlet atomization air pressure is required for environmental and operational purposes to be maintained at no greater than 10 p.s.i. It is common practice to test the outlet pressure of the air pressure passing through the spray gun using an adapter to connect the spray gun nozzle to a pressure test gauge or to fit a specially adapted test nozzle in place of the one to be used for spraying. The measurement of the air pressure must be the pressure of the air flowing through the nozzle outlet rather than a stationary head of pressure.

This known practice has the disadvantage that the testing of the nozzle pressure, as may be required before using the spray gun or during use, is a complex and often messy process in fitting an adapter to a nozzle coated in paint.

According to the present invention there is provided a pressure test gauge comprising a body having an inlet with means to seal the inlet to the source of air pressure to be tested, a gauge connected to the inlet, and a valve connected between the inlet and gauge to the outside of the body wherein a separate passage is connected between the inlet and the gauge.

Conveniently, the valve comprises a screw-threaded barrel with an axial metering hole. In a preferred construction the gauge has a digital display.

An embodiment of an air pressure test gauge will now be described by way of example only, with reference to the accompanying drawings, in which.

Figure 1:
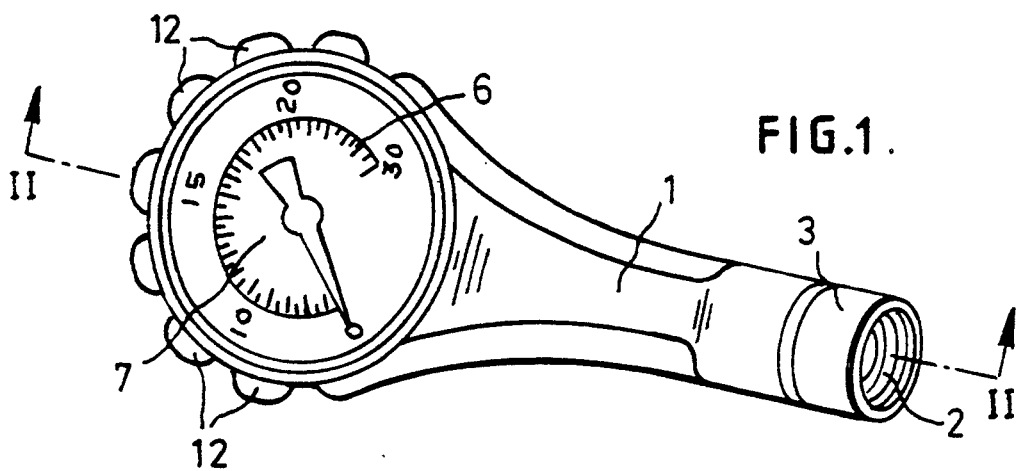
FIG. 1 is a perspective view of a pressure test gauge according to the present invention.

The pressure test gauge comprises a body 1 having an inlet 2 which may take the form of a replaceable screw in unit 3 sealed air-tight with the body 1. The unit 3 encircles the inlet 2 and connects with passages 4 and 5 passing through the body 1. The passage 5 is a small bore tube which connects the inlet 2 with a pressure gauge 6 which may have a digital or analogue display 7.

Intermediate the inlet unit 3 and the gauge 6 is a valve 8 comprising a barrel 9 with an outer screw-thread 10 to screw the valve into the body 1. Extending axially of the valve is a metering hole 11.

The pressure test gauge has a series of ribs 12 to facilitate the gauge to be held and applied in the hand when in use, or the gauge body 1 may be mounted on a surface, e.g. a wall, adjacent the location of use. In the example illustrated the body may be connected via bracket 13 with screws 14 to secure it to a wall (not shown). The spray gun can readily be checked for the correct outlet pressure by pushing the spray gun nozzle 15 (shown in chain-dotted line) against the pressure test gauge inlet 2 and turning on the flow of atomization air.

In operation, the unit 3 is selected to fit the front profile of the appropriate spray gun nozzle 15 and is then screwed into the pressure test gauge body 1. The valve 8 is selected to match the air flow characteristics of the spray gun nozzle in use and is screwed into the gauge body 1. Thus the air is allowed to flow through the passage 5 in the small bore tube to the passage 4 wherein the air pressure is measured and indicated by the gauge 6. From the passage 4, the air is vented through the metering hole 11 to atmosphere.

Figure 2:
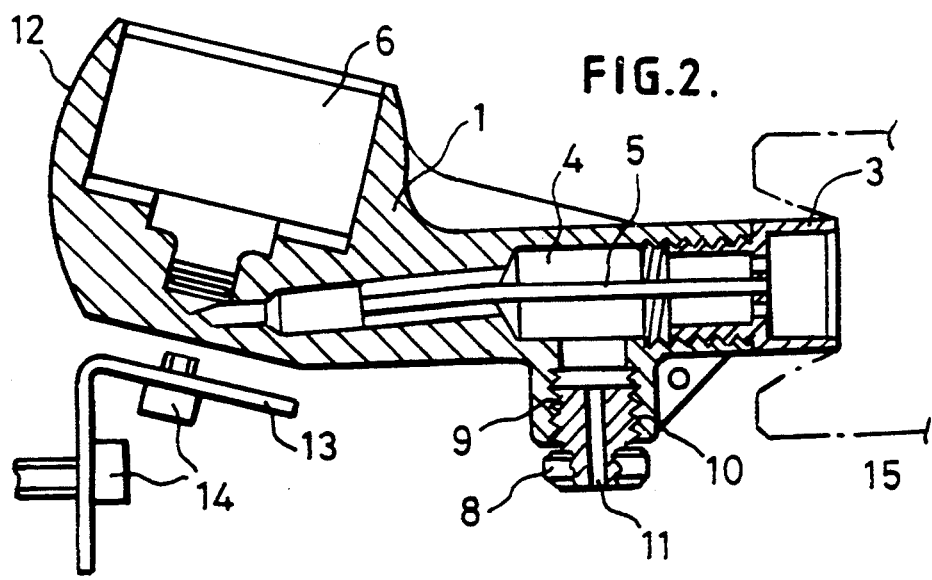
FIG. 2 is a longitudinal cross-section taken along the line II—II of FIG. 1.
Figure 3:
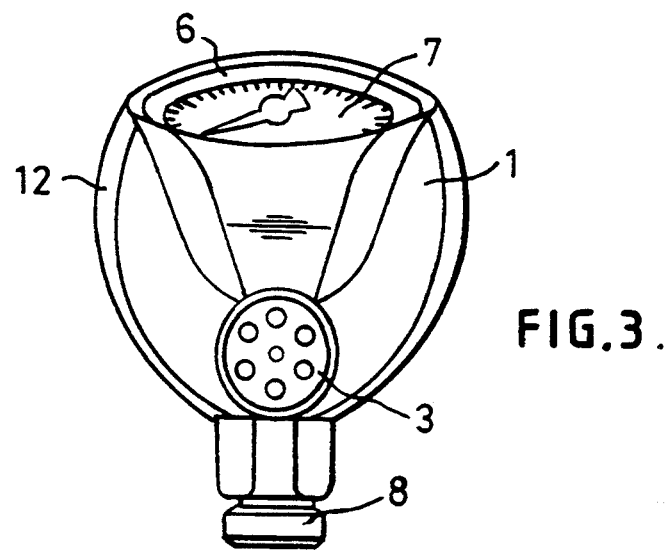
FIG. 3 is an end view of the test gauge shown in FIGS. 1 and 2.
Figure 4:
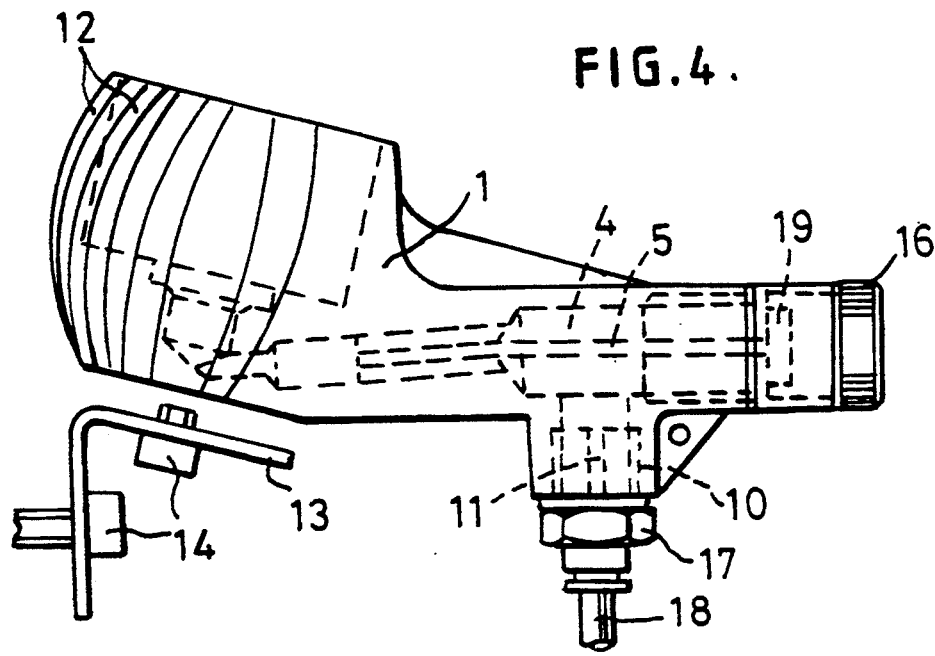
FIG. 4 is a side elevation of a modified construction of the test gauge.
Figure 5:
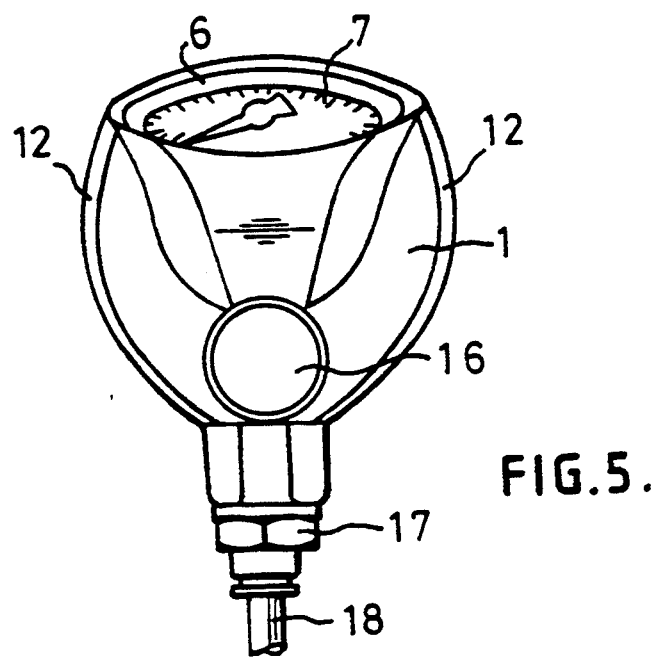
FIG. 5 is an end view of FIG. 4.

A modified test gauge construction is illustrated in FIGS. 4 and 5 in which like parts have the same reference numerals as in FIGS. 1 and 2. This gauge is modified for use in testing static pressure of subsidiary functions of equipment associated with spray guns. The inlet 2 to the gauge is closed by a blanking plug 16 and the valve 8 is replaced by an appropriate quick release connector 17 so that the air pressure passes via the tube 18 into the passage 4 encircling the tube 5 and passes via the recess 19 in the blanking plug 16 along the tube 5 to the gauge 6 to be tested.

We claim:

1. A gauge for measuring the atomization air pressure at a discharge orifice in a nozzle on a paint spray gun comprising a body having an air inlet, means surrounding said inlet for engaging a nozzle on a paint spray gun to form a sealed connection between the atomization air discharge orifice on the spray gun and said air inlet, means mounted in said body defining a calibrated metering hole vented to atmosphere, passage means connecting said air inlet to said metering hole, means mounted in said body for measuring and indicating the air pressure in said passage means.

2. A gauge for measuring the atomization air pressure at a discharge orifice in a nozzle on a paint spray gun, as set forth in claim 1, and wherein said metering hole is calibrated for a particular size spray gun air discharge orifice to produce an air pressure in said passage means during a measurement corresponding to the atomization air pressure in such spray gun at the discharge orifice when such spray gun is used to apply paint.

3. A gauge for measuring the atomization air pressure at a discharge orifice in a nozzle on a paint spray gun, as set forth in claim 2, and wherein said passage means includes a first passage extending through a small diameter tube to adjacent said measuring and indicating means, said first passage discharging air into a second passage connected to said metering hole.

4. A gauge for measuring the atomization air pressure at a discharge orifice in a nozzle on a paint spray gun, as set forth in claim 1, and wherein said passage means includes a first passage extending through a small diameter tube to adjacent said measuring and indicating means, said first passage discharging air into a second passage connected to said metering hole.

5. A gauge for measuring the atomization air pressure at a discharge orifice in a nozzle on a paint spray gun, as set forth in claim 4, and wherein said second passage surrounds said tube.

6. A gauge for measuring the atomization air pressure at a discharge orifice in a nozzle on a paint spray gun, as set forth in claim 1, and wherein said means surrounding said inlet for engaging a nozzle on a paint spray gun is replaceable to permit establishing a sealed connection to different configured spray gun nozzles.

7. A gauge for measuring the atomization air pressure at a discharge orifice in a nozzle on a paint spray gun, as set forth in claim 1, and further including bracket means for mounting said gauge on a wall.

* * * * *